Figure 1:
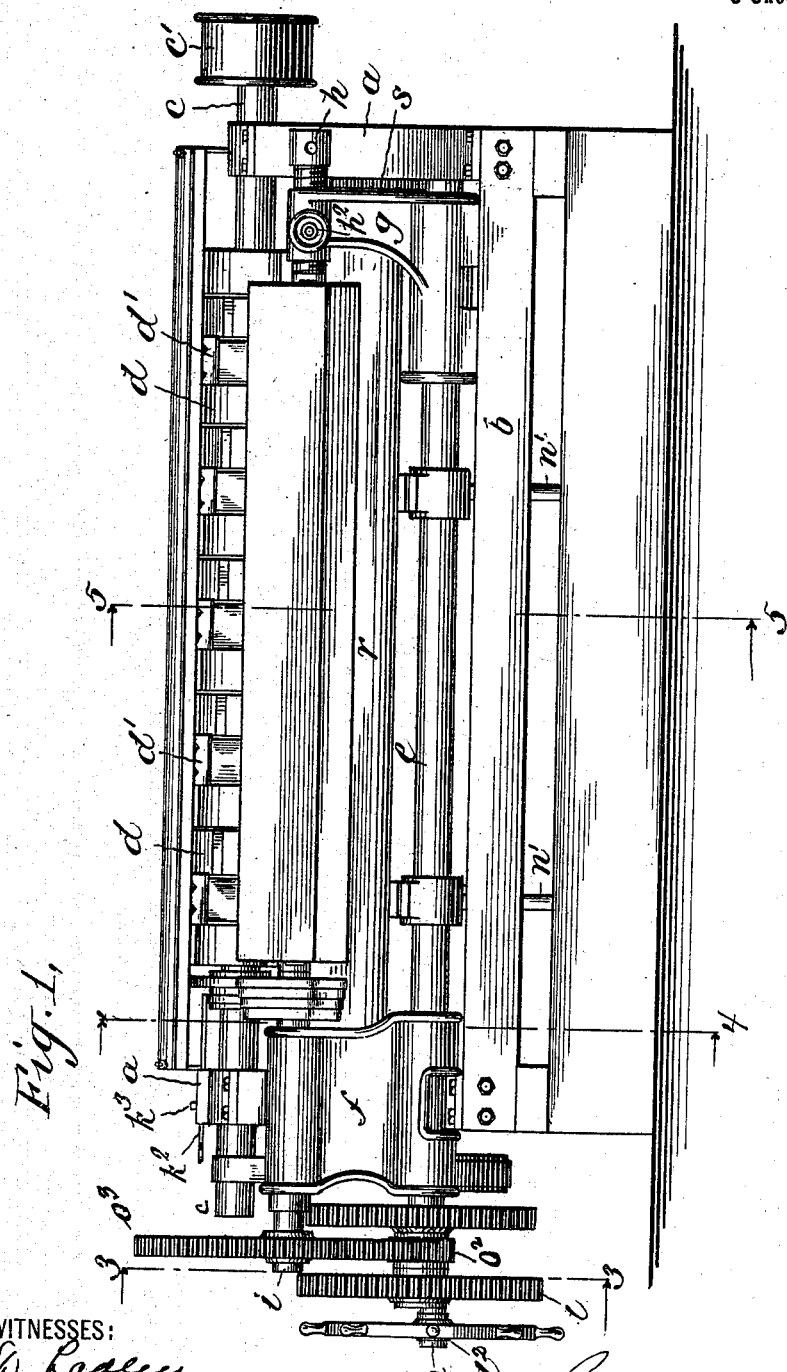

No. 681,218. Patented Aug. 27, 1901.
C. A. HEGE.
MACHINE FOR CUTTING CROSS TIES.
(Application filed Dec. 18, 1900.)
(No Model.) 5 Sheets—Sheet 1.

WITNESSES:
C. W. Radley.
M. W. Harrison.

INVENTOR
Constantine A. Hege
BY
Baldwin, Davidson & Wight
ATTORNEYS

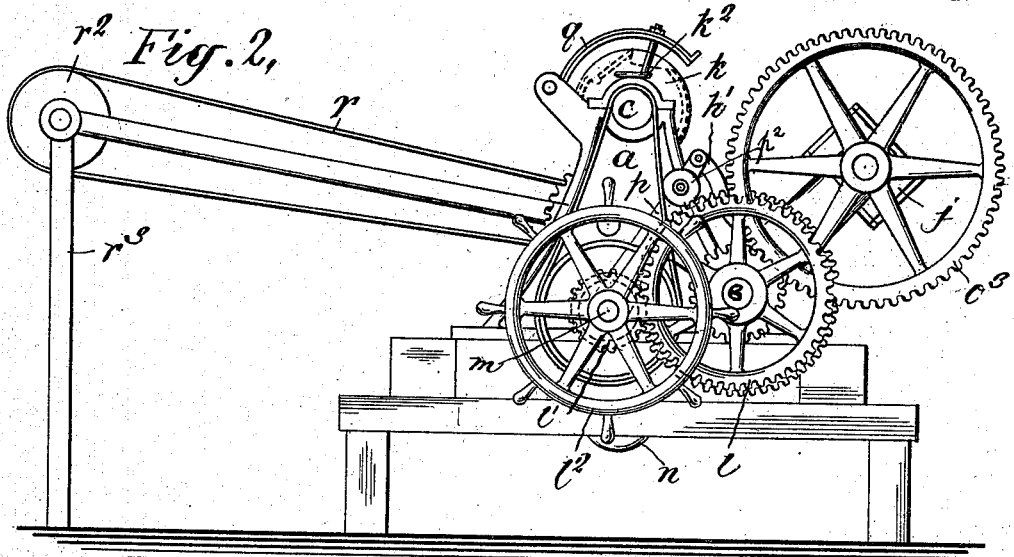
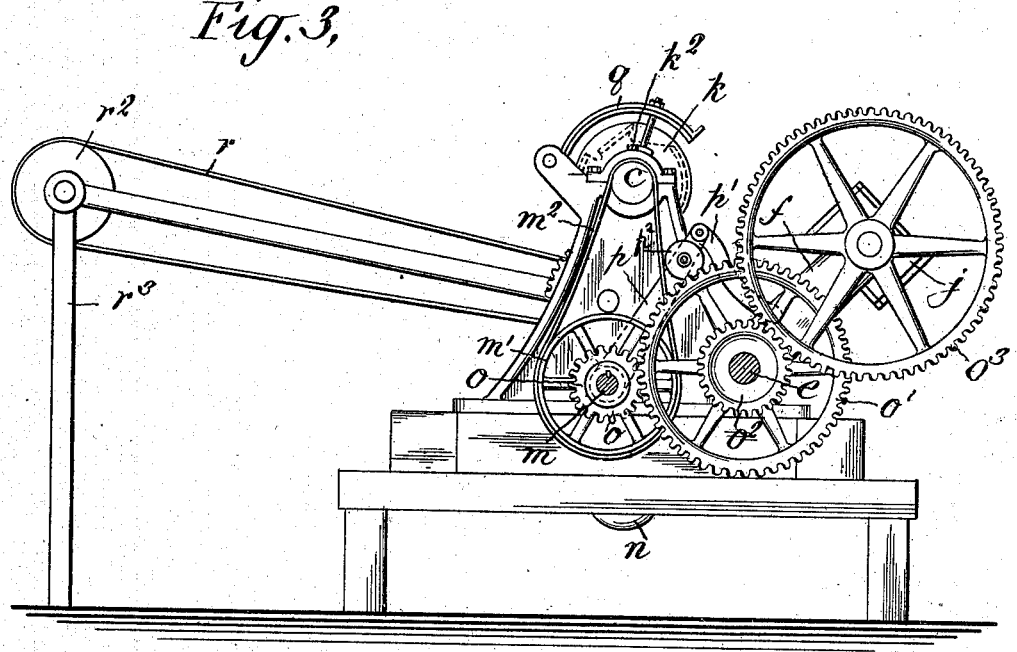

No. 681,218. Patented Aug. 27, 1901.
C. A. HEGE.
MACHINE FOR CUTTING CROSS TIES.
(Application filed Dec. 18, 1900.)
(No Model.) 5 Sheets—Sheet 3.

WITNESSES: INVENTOR
Constantine A. Hege
BY
Baldwin, Davidson & Wight
ATTORNEYS

No. 681,218. Patented Aug. 27, 1901.
C. A. HEGE.
MACHINE FOR CUTTING CROSS TIES.
(Application filed Dec. 18, 1900.)
(No Model.) 5 Sheets—Sheet 4.
Fig. 6.
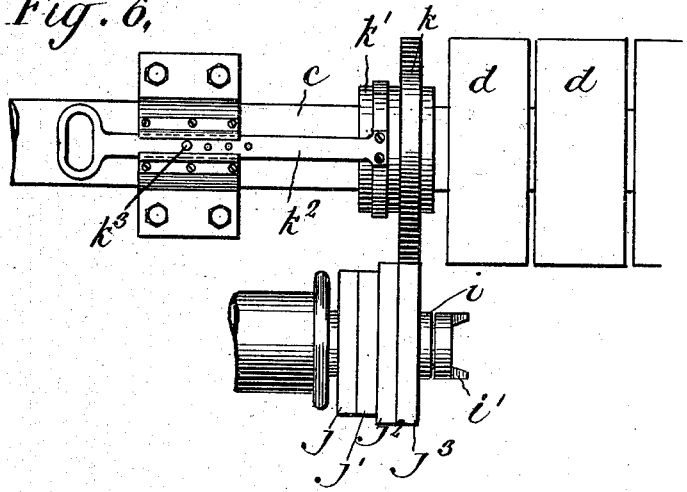
Fig. 7.
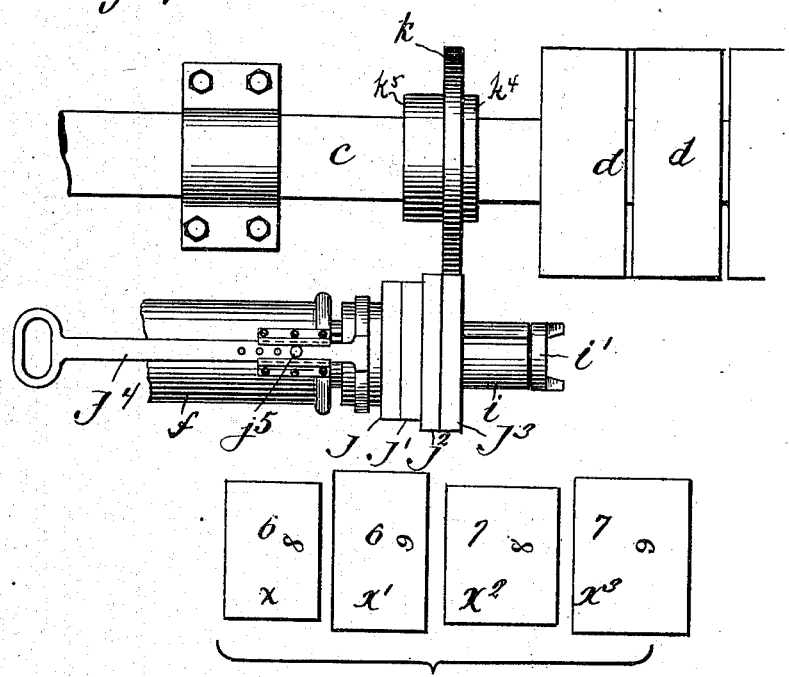
Fig. 8.
WITNESSES:
C. D. Radley
W. W. Harrison
INVENTOR
Constantine A. Hege
BY
Baldwin, Davidson & Wright
ATTORNEYS No. 681,218. Patented Aug. 27, 1901.
C. A. HEGE.
MACHINE FOR CUTTING CROSS TIES.
(Application filed Dec. 18, 1900.)
(No Model.) 5 Sheets—Sheet 5.
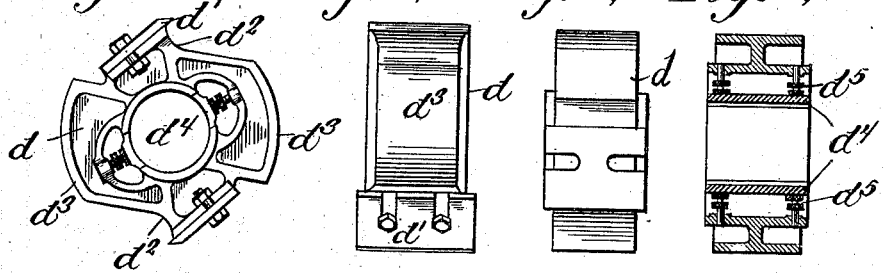
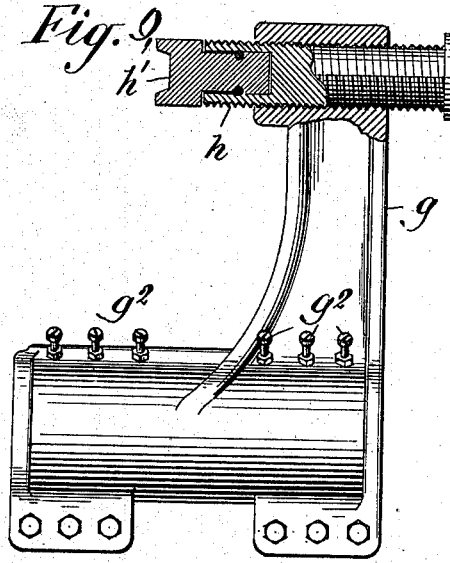
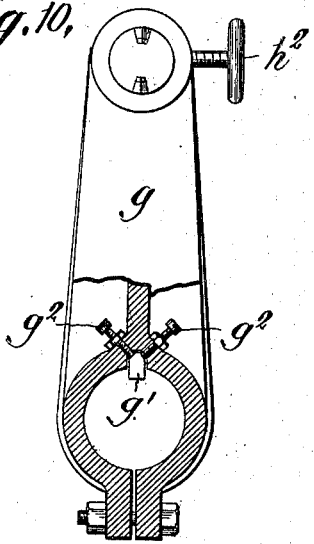
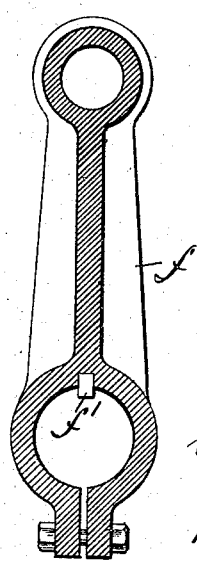
WITNESSES:
INVENTOR
Constantine A. Hege
BY
Baldwin, Davidson & Wight
ATTORNEYS

UNITED STATES PATENT OFFICE.

CONSTANTINE A. HEGE, OF SALEM, NORTH CAROLINA.

MACHINE FOR CUTTING CROSS-TIES.

SPECIFICATION forming part of Letters Patent No. 681,218, dated August 27, 1901.

Application filed December 18, 1900. Serial No. 40,270. (No model.)

*To all whom it may concern:*

Be it known that I, CONSTANTINE A. HEGE, a citizen of the United States, residing at Salem, in the county of Forsythe, North Carolina, have invented certain new and useful Improvements in Machines for Cutting Cross-Ties, of which the following is a specification.

In the railway-cross-tie-cutting machine forming the subject of this invention the logs or pieces of timber from which the cross-ties are to be cut are placed and held between suitable chucks carried by a head-stock and a tail-stock and presented to and held in the paths of rotating cutters which act longitudinally on the log or piece of timber in forming it into the desired shape. The head-stock and tail-stock are rigidly secured to a shaft fitted to rock in bearings in the frame of the machine, and means for rocking this shaft, as gearing controlled by a hand-wheel, is provided, whereby the log, although of considerable weight, may be moved toward and held against the revolving knives. To facilitate this work, so that it may be easily performed by one man, is one of the objects of this invention. The means devised for this purpose consist of one or more counter-weights secured to the rock-shaft and arranged about diametrically opposite the log held between the head-stock and the tail-stock, thus practically balancing the load carried by the rock-shaft, greatly reducing the labor of moving the log toward the cutters and the formed cross-tie away from them, and enabling the log to be held steadily and with proper delicacy of control against the cutters, and so insure the production of cross-ties having clean-cut and smooth surfaces throughout their length. This feature of cross-ties having smooth and even cut surfaces is an important one, as they are less liable to decay or deteriorate from atmospheric and ground-contact influences than are cross-ties having rough or irregular surfaces.

In forming cross-ties according to this system a pattern or "former" is employed of the shape of and preferably of the size of the cross-section of the completed cross-tie. Such former may be and preferably is secured to the spindle which holds the log at one of its ends and controls its rotation while being acted upon by the rotating cutters by contacting with a shoe or abutment, preferably a roller, whose contacting surface or point is in the active plane of the cutting edges of the knives. Logs or pieces of timber from which cross-ties are cut vary considerably in size, and it is not found practical to sort them into piles of different sizes suitable for making the different standard sizes of cross-ties, which standard sizes are generally in cross-section six by eight inches, six by nine inches, seven by eight inches, and seven by nine inches; and another object of this invention is to provide the machine with means whereby it may be readily set to form or cut the largest standard size of cross-tie commensurate with and from the log placed in the machine, as well as the smaller standard sizes, thus permitting the logs to be indiscriminately taken from a pile of mixed sizes.

The plan here adopted for instantly changing the machine to adapt it to cut different sizes of cross-ties comprises multiple formers or a set of formers of the standard shapes of the different-size cross-ties to be made by the machine, arranged side by side and secured, preferably, to the log-controlling spindle, a former-contacting shoe or roller preferably arranged axially with the shaft which carries the cutters and of a radius corresponding with that of the circular path or plane described by the cutting edges of the cutters, and means for setting the formers and the contacting shoe or roller longitudinally relatively to one another, so that the selected former corresponding with the cross-tie it is determined can best be cut from the log placed in operative position in the machine will be brought opposite to and act on the roller when the log is set, held, and rotated in the path of the cutters. The preferred size, location, and relative arrangement of the formers and shoe or roller are deemed to be the best and most practical and have therefore been specifically described. Other arrangements or other ways of carrying out the invention might be adopted.

The invention includes an improved manner of setting the tail-stock to bring its spindle in axial alinement with the spindle of the head-stock and to securely fasten the tail-stock to the rock-shaft and also other minor improved details of construction, all of which will now be particularly described by reference to the accompanying drawings, in which—

Figure 4:
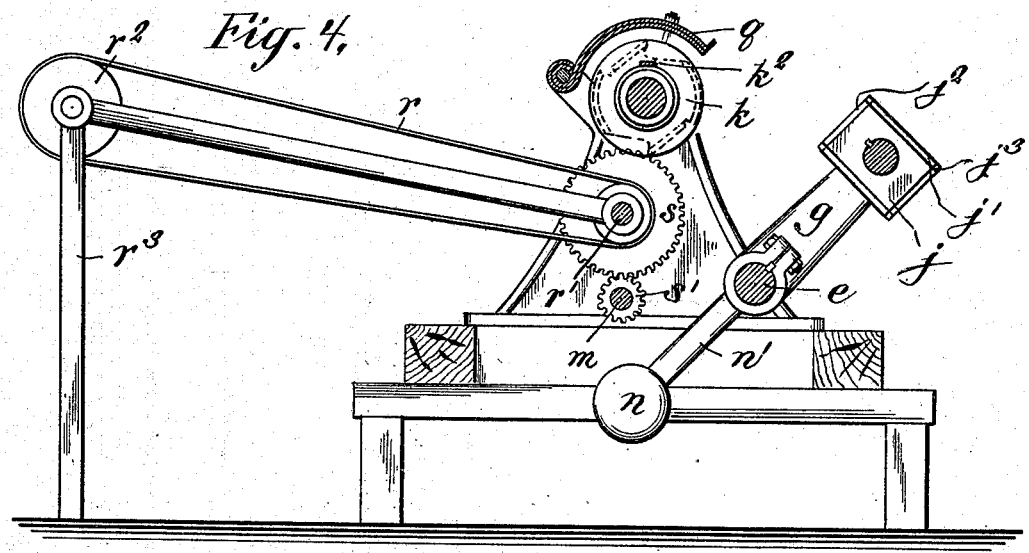
Figure 5:
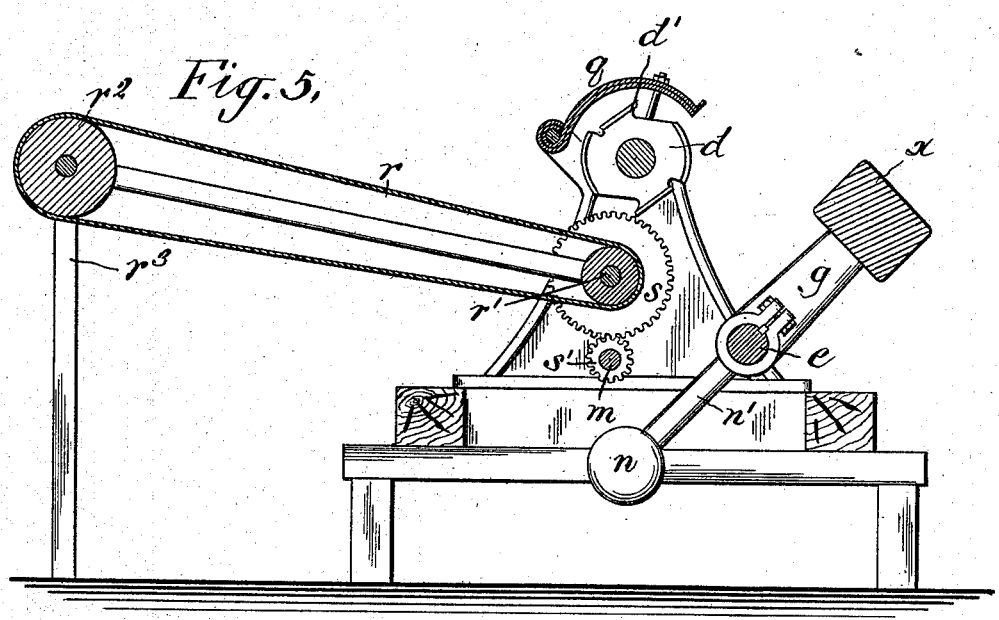

Figure 1 is a front elevation of a cross-tie-making machine embodying the invention; Fig. 2, an end elevation; Fig. 3, an end elevation, partly in section, taken on the line 3 3, Fig. 1; Fig. 4, a transverse section on the line 4 4, Fig. 1; Fig. 5, a similar section on the line 5 5, Fig. 1; Fig. 6, an enlarged detached view of the multiple formers and their controlling-roller; Fig. 7, a modification in the construction of the parts shown in Fig. 6. Fig. 8 illustrates the end views of four different sizes of cross-ties, corresponding in cross-section to the four formers; Fig. 9, an enlarged detached view of the tail-stock, partly in section; Fig. 10, an end elevation of the same, partly in section; Fig. 11, a transverse sectional elevation of the head-stock; Fig. 12, a side elevation of one of the cutter-heads complete; Fig. 13, a front view of the same; Fig. 14, a front view of one of the cutter-heads with the cutters removed; and Fig. 15, a sectional view of one of the cutter-heads, showing the clamping devices by which it is secured to the shaft.

The frame of the machine consists of the end pieces $a$ $a$ and the longitudinal connecting-girders $b$ $b$. In bearings provided at the upper ends of the end pieces $a$ $a$ is located the cutter-shaft $c$, on which are secured a series of cutter-heads $d$ $d$, each provided with suitably-formed cutters $d'$ $d'$, said shaft having at one end the driving-pulley $c'$.

In bearings in the lower part of and at one side of the frame is fitted to rock the shaft $e$, at one end of which and straddling an end bearing of the frame is securely fastened thereto the head-stock $f$, the method of forming the fastening being that shown at Fig. 11, and consisting of a key $f'$ and slit sleeves drawn together by bolts to rigidly clamp the head-stock to the shaft. At the other end of the rock-shaft $e$ is located the tail-stock $g$, the bore of which is slit, and bolts are provided for clamping it to the shaft $e$, and a key $g'$ is seated in the shaft and extends into a slot or groove formed opposite the slitted side of the bore. This slot is somewhat wider than the key $g'$, and the outer part of the key is beveled at its two sides, as clearly shown at Fig. 10. Set-screws $g^2$ $g^2$ pass angularly through the sleeve of the tail-stock $g$ and seat against the bevel faces of the key. This construction provides a simple and efficient means for setting the spindle $h$, carried at the upper end of the tail-stock, in perfect alinement with the spindle $i$, carried by the upper end of the head-stock $f$. The adjustment is readily accomplished by the two sets of set-screws $g^2$ $g^2$ bearing on the two beveled edges of the key, and the set-screws when seated home rigidly secure, in conjunction with the slitted clamp of the bore, the tail-stock to the shaft $e$.

The spindle $i$ of the head-stock $f$ is provided with a chuck $i'$, which seats into the end of the log, and so causes it to be rotated with the spindle. The spindle $h$ of the tail-stock is screw-threaded, the bore in the head of the tail-stock being tapped for its reception, and the inner end of the screw-spindle $h$ has fitted in a socket therein the chuck $h'$, which is held in connection therewith so as to rotate freely in relation thereto, as clearly shown at Fig. 9. By this arrangement the logs may be quickly placed and clamped in position between the chucks $h'$ and $i'$ by manipulating the screw-spindle $h$, which is locked by a set-screw $h^2$. Both chucks turn with the log, no dependence being placed on the strength of the wood for either of its end bearings, and consequently all danger of the log becoming loose while under the action of the cutters is avoided. The key-seat in the shaft $e$ for the key $g'$ is extended sufficiently along it for the tail-stock $g$ to be set in all positions necessary for holding all lengths of logs the machine is designed to cut into cross-ties.

The plan adopted for enabling different sizes of ties to be readily interchangeably made by the machine consists, as before stated, in using multiple formers in conjunction with a single roller. The formers $j$ $j'$ $j^2$ $j^3$ are located on the spindle $i$, more particularly shown in the views Figs. 6 and 7, and are designed to cause logs to be respectively formed, as shown at $x$ $x'$ $x^2$ $x^3$, Fig. 8, which illustrate the relative sizes and shapes of the formers and of the cross-sections of the cross-ties. The formers may be made of separate pieces or cast or otherwise made of one piece of metal. They are shown at Fig. 6 as being rigidly connected to the spindle $i$. Their cooperating roller $k$ is shown as fitted to rotate on a sleeve $k'$, which fits loosely on the cutter-shaft $c$ and is adapted to be longitudinally moved thereon, so that the roller $k$ may be set opposite either one of the formers, as desired. This setting of the roller $k$ may readily be performed by means of the rod $k^2$, having a rotatable forked connection with the sleeve $k'$ at its inner end and a handle at its outer end. The rod slides in a guide on the frame $a$ or on the cap of the cutter-shaft bearing and is held in any of its set positions to hold the roller $k$ opposite the desired former by means of the pin $k^3$, which is passed through one of the holes formed in the rod and into a hole formed in the top of the frame or cap of the bearing.

In the modification shown at Fig. 7 the roller $k$ is held on the shaft $c$ by means of side collars $k^4$ $k^5$, so as to have no longitudinal play thereon, but is free to rotate in relation thereto, and the formers $j$ $j'$ $j^2$ $j^3$ are fitted by a key-and-slot connection to slide longitudinally on, but are caused to rotate with, the spindle $i$, they being provided with a hub, in a groove formed in which is seated the forked end of a rod $j^4$, which has a slide guide-and-pin connection $j^5$ with the top of the head-stock $f$ in the same manner as the rod $k^2$ is fitted and controlled. In this arrangement the formers are longitudinally moved and set relatively to their coacting roller, while in the other the roller is moved and set, but in both cases the functions of and the results produced by this multiformer device are the same, and it provides a simple and ready means for any one of a selected series of forms or shapes to be imparted to a log held in the machine or to change a tie imperfectly cut to one of a smaller size without any change in the positions of the log or tie and the cutters relatively to one another other than the necessary closer approach of the log to the cutters to further reduce its size. The particular means employed for changing the relation of the set of formers to the shoe, roller, or abutment, whether it be a sliding rod, as shown, a lever or worm-and-wheel arrangement, or of any other form, is quite immaterial so far as the broad invention is concerned. Any suitable means may be employed.

The shaft $e$ is rocked and the log carried by the head-stock and tail-stock is caused to be moved toward and from the cutters through the medium of the gear-wheel $l$, secured to the shaft $e$, the pinion $l'$ meshing therewith and connected to the hand-wheel $l^2$, the hand-wheel and the pinion being fitted to turn loosely on the end of the shaft $m$. The hand-wheel $l^2$, pinion $l'$, and gear $l$ are so proportioned that the operator will have full control over the log when placed in operative position, and the counterbalancing means for aiding in such control by the operator consist of weights $n$ $n$ on the ends of arms $n'$ $n'$, which are clamped to the shaft $e$, the weights being preferably set diametrically opposite the log carried by the head and tail stocks.

The shaft $m$ extends from one end of the machine to the other, and on it is secured the pulley $m'$ and the pinion $o$, said pulley receiving motion by the belt $m^2$ from the shaft $c$. This belt is normally slack and is only tightened sufficiently to turn the shaft $m$ when the shaft $e$ is rocked to bring the head and tail stocks toward the cutters. This is brought about by means of a tightening-roller $p^2$, carried by the arm $p$, fitted to rock on the shaft $m$ and connected to the head-stock $f$ by the link $p'$. The pulley $m'$ when rotated imparts rotary motion to the spindle $i$, and so to the log held and controlled by its chuck, through the medium of the pinion $o$, the gear-wheel $o'$, the pinion $o^2$, attached to the wheel $o'$, and the gear-wheel $o^3$, secured to the end of the spindle $i$. Rotary motion is, however, only imparted to the log when it is brought into proximity to the cutters, so as to be rotated slowly as it is held in position to be acted upon by the cutters, and its rotary movement ceases as it is moved away from the cutters, leaving the spindle of the head-stock stationary for the removal of the cut tie therefrom and the application of a fresh log thereto. A guard $q$, secured to the frame, extends over the cutters, as shown.

To convey chips away from the machine, a traveling belt $r$ is provided. This belt is carried by a roller on the shaft $r'$, located parallel with and beneath the rotary cutter, and a roller $r^2$, carried by the frame $r^3$. To the shaft $r'$ is secured a gear-wheel $s$, which meshes into and is actuated by the pinion $s'$, secured to the shaft $m$.

The improvement in the cutter-heads consists in providing recesses in front of the edges of the cutters $d'$ of considerable size to prevent the jamming of the chips in front of the cutters, as shown at $d^2$, this being necessary or very desirable with cutters used on a machine of this character, as the chips are formed in large quantities; and it also consists in the bearing surfaces or shoes $d^3$, which are formed integral with the cutter-heads and extend over considerable portions of the spaces between the cutters, so as to insure the proper action of the cutters on the log. For these reasons it is preferred to provide each head with two cutters only, as shown in the views, Figs. 12 to 15. The means devised and here adopted for clamping the cutter-heads to the shaft consist of plates $d^4$ $d^4$, located in slots formed through the hub of the head, and set-screws and jam-nuts $d^5$ $d^5$, the screws being seated in the outer parts of the longitudinal recesses formed through the head above the slots in the hubs and bearing against the backs of the plates $d^4$ $d^4$ to cause a firm gripping action on the shaft. The knives $d'$ are secured on the heads by bolts, which pass through slots in their rear end to permit of their adjustment and through lateral slots or openings (shown at Fig. 14) formed in the edges of flanges of the head, such arrangement forming a very cheap and simple construction.

This machine for making railway cross-ties is here shown supported on a fixed foundation. It is obvious that it may be provided with suitable transporting-wheels, by which it may be readily moved into localities where it is desired to operate it and be operated without removal from the wheels.

The four formers correspond with the four standard sizes of cross-ties. Of course the series of formers may be extended or may be restricted to two or three, according to the scope of operation in cutting cross-ties for which any particular machine is designed.

I claim as my invention—

1. In a cross-tie-cutting machine, the combination with a series of cutters revolving in fixed relation to their axis of rotation and having their cutting edges a uniform radial distance from such axis, of a log-carrier movable toward and from the cutters, means for rotating the log carried thereby when in operative juxtaposition to the cutters, whereby the entire series of cutters acts uniformly upon the sides of the log throughout its length, a series of formers determining the size or cross-section to which the logs are to be cut, and means whereby either of the formers may be thrown into active operation to cause the log to be cut to the corresponding cross-section.

2. In a cross-tie-cutting machine, the combination with a series of cutters revolving in fixed relation to their axis of rotation and having their cutting edges a uniform radial distance from such axis, of a swinging counterbalanced log-carrier having chucks to receive and hold a log, manually-operated mechanism for swinging the log-carrier toward and from the cutters, means for rotating the log mounted in the log-carrier when in operative juxtaposition to the cutters whereby the entire series of cutters acts uniformly upon the sides of the log throughout its length, a series of formers determining the size or cross-section to which the logs are to be cut, and means whereby either of the formers may be thrown into active operation to cause the log to be cut to a corresponding cross-section.

3. In a cross-tie-cutting machine, the combination with a series of cutters revolving in fixed relation to their axis of rotation and having their cutting edges a uniform radial distance from such axis, of a log-carrier movable toward and from the cutters, chucks on the log-carrier to receive and hold a log, means whereby the chucks are rotated when the log is in operative juxtaposition to the cutters, whereby the entire series of cutters acts uniformly upon the sides of the log throughout its length, a series of formers determining the size or cross-section to which the log is to be cut and mounted axially in line with the axis of said chucks to rotate therewith, and means whereby either of the formers may be thrown into active operation to cause the log to be cut to the corresponding cross-section.

4. In a cross-tie-cutting machine, the combination with a series of cutters revolving in fixed relation to their axis of rotation and having their cutting edges a uniform radial distance from such axis, of a log-carrier movable toward and from the cutters and comprising a tail-stock with its chuck, a head-stock, its rotating spindle and chuck, means for rotating said spindle when the log is in operative juxtaposition to the cutters, whereby the entire series of cutters acts uniformly upon the sides of the log throughout its length, a series of formers mounted upon and rotating with said spindle and determining the size and cross-section to which the logs are to be cut, an abutment-ring rotatable on the cutter-shaft, and means whereby said ring and either of the formers are brought opposite each other to thereby cause the log to be cut to the cross-section corresponding to said former.

5. In a cross-tie-cutting machine, the combination with a series of cutters revolving in fixed relation to their axis of rotation and having their cutting edges a uniform radial distance from such axis, a swinging counterbalanced log-carrier and mechanism manually operated to swing it toward and from the cutters, its tail-stock with its chuck, a head-stock, its rotating spindle and chuck, means for rotating said spindle when the log is in operative juxtaposition to the cutters, whereby the entire series of cutters acts uniformly upon the sides of the log throughout its length, a series of formers mounted upon and rotating with said spindle and determining the size or cross-section to which the logs are to be cut, an abutment-ring rotatable on the cutter-shaft, and means whereby said ring and either of the formers are brought opposite each other to thereby cause the log to be cut to the cross-section corresponding to said former.

6. In a cross-tie-cutting machine, the combination with a series of cutters revolving in fixed relation to their axis of rotation and having their cutting edges a uniform radial distance from such axis, of a log-carrier movable toward and from the cutters and comprising a tail-stock with its chuck, a head-stock, its rotating spindle and chuck, means for rotating said spindle when the log is in operative juxtaposition to the cutters, whereby the entire series of cutters acts uniformly upon the sides of the log throughout its length, a series of formers mounted upon and rotating with said spindle and determining the size or cross-section to which the logs are to be cut, an abutment-ring rotatable on the cutter-shaft and movable longitudinally thereon, and means for moving the ring opposite either of the formers to thereby cause the log to be cut to a cross-section corresponding to said former.

7. In a cross-tie-cutting machine, the combination of a series of rotating cutters, and the swinging log-carrier comprising a rock-shaft, a head-stock at one end thereof, a tail-stock at the other end thereof, a key fitted in the shaft and having beveled outer edges, a slot in the hub of the tail-stock greater in width than said key and set-screws angularly arranged and passing through the hub of the tail-stock and bearing on the beveled edges of the key.

In testimony whereof I have hereunto subscribed my name.

CONSTANTINE A. HEGE.

Witnesses:
C. P. NORFLEET,
P. E. BECK.